US012802587B2

(12) United States Patent
Ratcliffe, Jr. et al.

(10) Patent No.: US 12,802,587 B2
(45) Date of Patent: Nov. 17, 2026

(54) MODIFYING WORD STRUCTURE BASED ON READING COMPREHENSION LEVELS USING MACHINE LEARNING

(71) Applicant: Truist Bank, Charlotte, NC (US)

(72) Inventors: Ronald Lee Ratcliffe, Jr., Garner, NC (US); Reinaldo Gamaliel Rivera Colon, Raleigh, NC (US); Jennifer Merten, Brookhaven, GA (US)

(73) Assignee: TRUIST BANK, Charlotte, NC (US)

( * ) Notice: Subject to any disclaimer, the term of this patent is extended or adjusted under 35 U.S.C. 154(b) by 921 days.

(21) Appl. No.: 17/843,685

(22) Filed: Jun. 17, 2022

(65) Prior Publication Data

US 2023/0410677 A1 Dec. 21, 2023

(51) Int. Cl.
*G09B 17/00* (2006.01)
*G09B 5/02* (2006.01)

(52) U.S. Cl.
CPC ............. *G09B 17/003* (2013.01); *G09B 5/02* (2013.01)

(58) Field of Classification Search
CPC ............... G09B 5/00; G09B 7/00; G09B 5/02
See application file for complete search history.

(56) References Cited

U.S. PATENT DOCUMENTS

| | | | | |
|---|---|---|---|---|
| 8,602,793 | B1 * | 12/2013 | Sniedzins | G09B 5/00 434/323 |
| 12,080,187 | B1 * | 9/2024 | Ferrucci | G06F 40/30 |
| 2006/0166174 | A1 * | 7/2006 | Rowe | G09B 5/06 434/236 |
| 2006/0190242 | A1 * | 8/2006 | Burstein | G06F 40/58 704/2 |
| 2020/0135039 | A1 * | 4/2020 | Karna | G09B 7/00 |
| 2020/0364690 | A1 * | 11/2020 | Brazier, III | G06Q 20/356 |

* cited by examiner

*Primary Examiner* — Robert J Utama
(74) *Attorney, Agent, or Firm* — Nicholas Martin; Greenberg Traurig, LLP; Michael A. Springs

(57) ABSTRACT

Using a trained machine learning model for modifying word structures in financial literacy content based on age is provided. For example, a computing system can determine a first reading comprehension level for a set of financial literacy content. The set of financial literacy content can include sentences. The computing system can input the sentences into a trained machine learning model. The computing system can receive one or more updates to the sentences from the trained machine learning model. The computing system can generate an updated set of financial literacy content based on the one or more updates to the sentences. The one or more updates to the sentences can have a second reading comprehension level that is different than the first reading comprehension level. The computing system can output the updated set of financial literacy content as a graphical user interface to a user device associated with a user account.

20 Claims, 3 Drawing Sheets

MODIFYING WORD STRUCTURE BASED ON READING COMPREHENSION LEVELS USING MACHINE LEARNING

TECHNICAL FIELD

The present disclosure relates to machine learning. More specifically, but not by way of limitation, this disclosure relates to modifying word structures using machine learning.

BACKGROUND

Online and mobile banking applications can allow users to interact with a financial institution's products and services by accessing their user account. In some cases, the products and services can include financial literacy content displayed on a graphical user interface that focuses on teaching and advising adults on financial literacy principles such as budgeting, investing, or saving. The financial literacy content can often include complex concepts that may be difficult for children to comprehend.

SUMMARY

One example of the present disclosure includes a system comprising a processor and a non-transitory computer-readable memory. The non-transitory computer-readable memory can include instructions that are executable by the processor for causing the processor to perform operations. The operations can include determining a first reading comprehension level for a set of financial literacy content, the set of financial literacy content comprising a plurality of sentences. The operations can include inputting the plurality of sentences into a trained machine learning model. The operations can include receiving, from the trained machine learning model, one or more updates to the plurality of sentences. The operations can include generating an updated set of financial literacy content based on the one or more updates to the plurality of sentences, the one or more updates having a second reading comprehension level that is different than the first reading comprehension level. The operations can include outputting, to a user device associated with a user account, the updated set of financial literacy content as a graphical user interface.

Another example of the present disclosure includes a method. The method can include determining, by a processor, a first reading comprehension level for a set of financial literacy content, the set of financial literacy content comprising a plurality of sentences. The method can include inputting, by the processor, the plurality of sentences into a trained machine learning model. The method can include receiving, by a processor, one or more updates to the plurality of sentences from the trained machine learning model. The method can include generating, by the processor, an updated set of financial literacy content based on the one or more updates to the plurality of sentences, the one or more updates having a second reading comprehension level that is different than the first reading comprehension level. The method can include outputting, by a processor, the updated set of financial literacy content as a graphical user interface to a user device associated with the user account.

Yet another example of the present disclosure includes a non-transitory computer-readable medium that comprises program code that is executable by the processor for causing the processor to perform operations. The operations can include determining a first reading comprehension level for a set of financial literacy content, the set of financial literacy content comprising a plurality of sentences. The operations can include inputting the plurality of sentences into a trained machine learning model. The operations can include receiving, from the trained machine learning model, one or more updates to the plurality of sentences. The operations can include generating an updated set of financial literacy content based on the one or more updates to the plurality of sentences, the one or more updates having a second reading comprehension level that is different than the first reading comprehension level. The operations can include outputting, to a user device associated with a user account, the updated set of financial literacy content as a graphical user interface.

DETAILED DESCRIPTION

Figure 1:
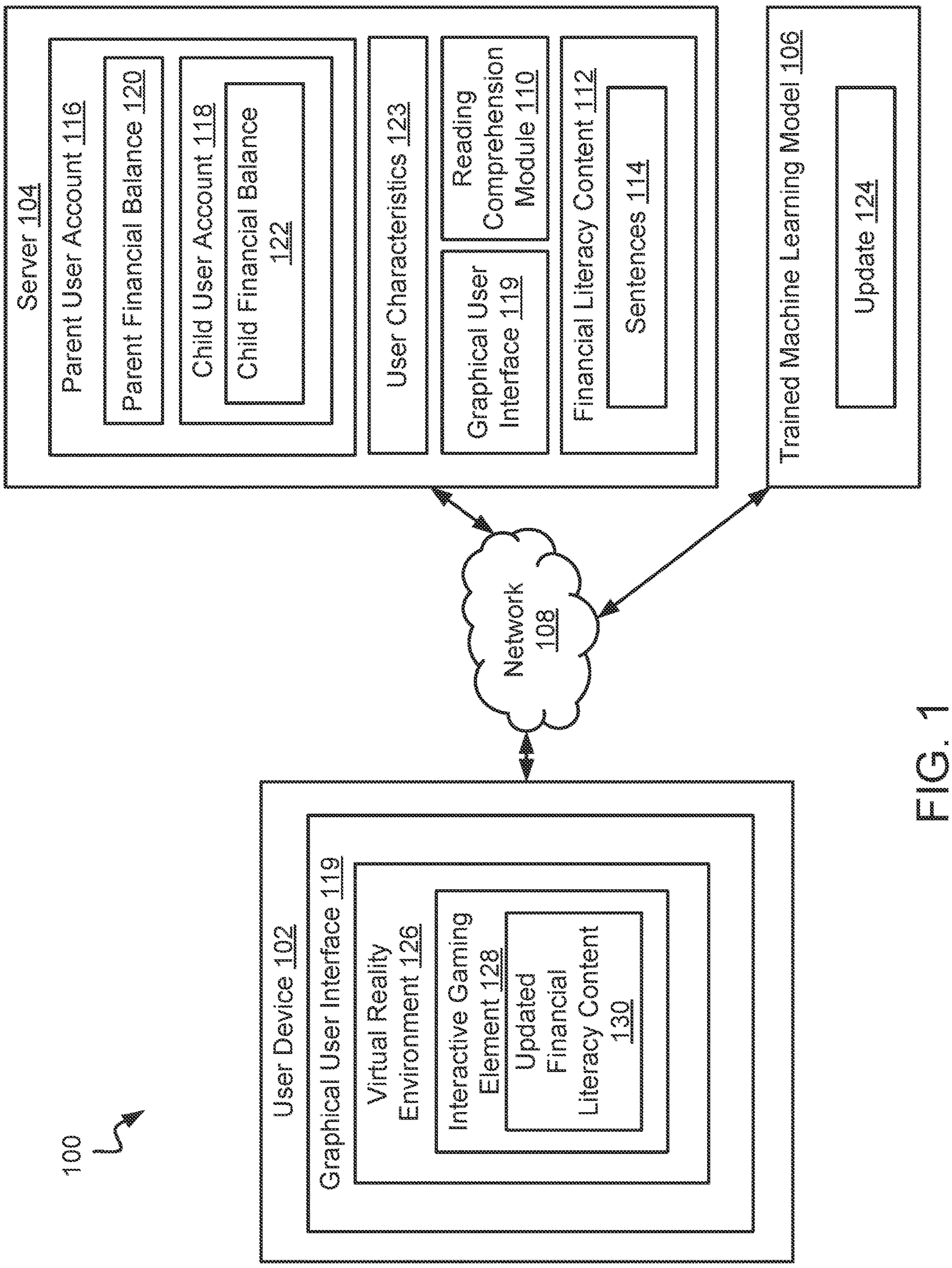
FIG. 1 is a block diagram illustrating an example of a computing environment for using a trained machine learning model to modify word structure according to some aspects of the present disclosure.

Certain aspects and features relate to using a trained machine learning model to modify word structures of financial literacy content based on age. For example, existing financial literacy content is often directed to teaching adults about money. Adult-focused financial literacy content may include complex vocabulary and sentence structures that may be difficult for children to understand. Inputting the adult-focused financial literacy content into a trained machine learning model can result in outputted updates to the adult-financial literacy content that can be used to generate child-focused financial literacy content. Such a trained machine learning model can be generated by training a machine learning model using adult-focused content and child-focused content. The generated child-focused financial literacy content can be outputted as a graphical user interface for display on a user device for a user, such as a child. The child-focused financial literacy content may have a similar reading comprehension level as the user, which may increase understanding of financial literacy principles by the user.

In some examples, the updated financial literacy content can be outputted for display within a virtual reality environment. The virtual reality environment can be targeted towards teaching children about money. Users, such as children, can interact with elements within the virtual reality environment. For example, the updated financial literacy content can be incorporated into interactive gaming elements or visualization elements within the virtual reality environment. The interactive gaming elements may include games directed to teaching financial literacy principles in a child-friendly and visually appealing manner. The sentence structure and word choices used in the interactive gaming elements can be based on the updated financial literacy content.

Additionally, the virtual reality environment can include visualization elements based upon a user account associated with the virtual reality environment. The user account can be a child user account attached to a parent user account, and in some examples may include a financial balance. The visualization elements can be visual representations of the financial balance in the child user account. For example, the visualization elements can include diagrams, such as pie charts, graphs, cartoons, or any other type of visual element or diagram, that can display how the funds in the child user account are being spent, saved, earned, or invested. In some examples, the visualization elements can include personalized financial literacy content. The financial literacy content displayed in the visualization elements can be personalized to an age or a reading comprehension level of the user based upon outputted results from the trained machine learning model.

These illustrative examples are given to introduce the reader to the general subject matter discussed here and are not intended to limit the scope of the disclosed concepts. The following sections describe various additional features and examples with reference to the drawings in which like numerals indicate like elements.

FIG. 1 is a block diagram illustrating an example of a computing environment 100 for using a trained machine learning model 106 to modify word structure according to some aspects of the present disclosure. The computing environment 100 can include a user device 102, a server 104, and a trained machine learning model 106 communicatively coupled via a network 108. Each communication within the computing environment 100 may occur over one or more data networks, such as a public data network, a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). Examples of user devices can include desktop computers, videogame consoles, mobile phones (e.g., cellular phones), PDAs, tablet computers, net books, laptop computers, handheld specialized readers, and wearing devices such as smart watches.

The server 104 can include a reading comprehension module 110 that can be used to determine reading comprehension levels. The server 104 can also include financial literacy content 112 composed of sentences 114. The financial literacy content 112 can be content directed towards teaching adults how to manage finances. For example, the financial literacy content 112 can teach the fundamentals of spending, saving, giving, investing, applying for loans, calculating interest, or any other financial topics. The server 104 may determine, using the reading comprehension module 110, that the sentences 114 in the financial literacy content 112 have a first reading comprehension level. The reading comprehension module 110 may determine the first reading comprehension level based on the sentence structure, word choices, and complexity of content.

The server 104 can also include a parent user account 116. The parent user account 116 may be a financial account that includes a parent financial balance 120. The parent user account 116 can be attached to or can include a child user account 118. The child user account 118 can be a financial account with restrictions placed via the parent user account 116. For example, the child user account 118 may have restrictions on the amounts or frequencies of withdrawal from the child financial balance 122. The server 104 may determine, using the reading comprehension module 110, a reading comprehension level of a user associated with the child user account 118. For example, the server 104 may determine a set of user characteristics 123 associated with the user of the child user account 118. Examples of the user characteristics 123 can include an age, an education history, and an average reading speed of the user. The average reading speed may be determined by analyzing user activity observations received in response to the user interacting with the child user account 118 via the user device 102. The server 104 can determine, using the reading comprehension module 110, that the user has a second reading comprehension level that differs from the first reading comprehension level of the financial literacy content 112. For example, the first reading comprehension level may be higher than the second reading comprehension level if the user is a child.

In response to determining that the user has the second reading comprehension level that differs from the first reading comprehension level of the financial literacy content 112, the server 104 can input the sentences 114 of the financial literacy content 112 into the trained machine learning model 106. Examples of a machine learning model can include a neural network, a Naive Bayes classifier, or a support vector machine. The trained machine learning model 106 can be generated by training a machine learning model with a variety of financial literacy content with differing reading comprehension levels. For example, the trained machine learning model 106 may use an algorithm to generate updates 124 to the sentences 114. The updates 124 can be transmitted to the server 104. The server 104 can generate updated financial literacy content 130 using the updates 124 from the trained machine learning model 106.

The server 104 can determine, using the reading comprehension module 110, that the updated financial literacy content 130 has a reading comprehension level that is the same as or similar to the second reading comprehension level of the user. If the updated financial literacy content 130 has a reading comprehension level that differs significantly from the second reading comprehension level of the user, the server 104 can input sentences form the updated financial literacy content 130 into the trained machine learning model 106 to receive another update 124. Iterations of the financial literacy content 130 can continue to be inputted into the trained machine learning model 106 until an updated financial literacy content 130 has a same or similar reading comprehension level as the user.

The server 104 can generate a graphical user interface 119 for displaying the updated financial literacy content 130 on a user device 102 associated with the child user account 118. The user may experience increased understanding and comprehension of the updated financial literacy content 130 as compared to the original financial literacy content 112. In some examples, the graphical user interface 119 may include a virtual reality environment 126. The updated financial literacy content 130 may be displayed within the virtual reality environment 126. In such examples, the user device 102 can include a virtual reality headset that is communicatively coupled to the user device 102. The server 104 can generate the virtual reality environment 126 for the child user account 118 and can transmit the virtual reality environment 126 to the user device 102 for display. For example, the virtual reality headset may render a virtual reality environment 126 for display to a user. In some examples, the user device 102 can include a controller in communication with the virtual reality environment 126 for receiving input from a user of user device 102, or for providing sensory output to the user of the user device 102.

The virtual reality environment 126 can include elements for teaching children about money. For example, the teaching elements can include cartoons, videos, or other media explaining financial literacy concepts. The teaching elements can further include an interactive gaming element 128 that the user can interact with using the user device 102. The server 104 can incorporate the updated financial literacy content 130 into any of the teaching elements. For example, the sentence structure and word choices used in the interactive gaming elements may be modified according to the updates 124 received from the trained machine learning model 106.

In some examples, in response to input received from the user device 102 based on the user interacting with the interactive gaming element 128, the server 104 can transfer funds from the parent financial balance 120 in the parent user account 116 to the child financial balance 122 in the child user account 118. For example, funds from the parent user account 116 may be automatically deposited into the child user account 118 in response to certain conditions in the virtual reality environment 126 being met. In one example, virtual credits earned in the interactive gaming element 128 can be converted into funds deposited into the child user account 118. In another example, the server 104 can deposit funds into the child user account 118 from the parent user account 116 in response to a user completing a certain number of interactive gaming elements 128 directed towards teaching about financial literacy in the virtual reality environment 126. The child financial balance 122 can be available to the user for use in the virtual reality environment 126 or in the real world. The updated financial literacy content 130 can aid the user in understanding and completing the interactive gaming elements 128.

In some examples, the server 104 can input the financial literacy content 112 into the trained machine learning model 106 in response to determining a change in the user characteristics 123. For example, the server 104 may determine that an average reading speed of the user on the user device 102 has increased. In response to determining a change in the user characteristics 123, the server 104 can use the reading comprehension module 110 to determine a new reading comprehension level for the user. The server 104 can then input the financial literacy content 112 into the trained machine learning model 106. The server 104 can continue to generate updated financial literacy content 130 based on updates from the trained machine learning model 106 until a reading comprehension level of the updated financial literacy content 130 is the same as or similar to the new reading comprehension level for the user.

Additionally or alternatively, the server 104 can input the financial literacy content 112 into the trained machine learning model 106 in response to determining that a predetermined amount of time has passed. For example, the server 104 can determine that a year has passed, which may indicate that the reading comprehension level of the user has increased. The server 104 can use the reading comprehension module 110 to determine a new reading comprehension level for the user. The server 104 can then input the financial literacy content 112 into the trained machine learning model 106. The server 104 can continue to generate updated financial literacy content 130 based on updates from the trained machine learning model 106 until a reading comprehension level of the updated financial literacy content 130 is the same as or similar to the new reading comprehension level for the user.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the trained machine learning model 106 and the server 104, may instead be implemented in a single device or system.

Figure 2:
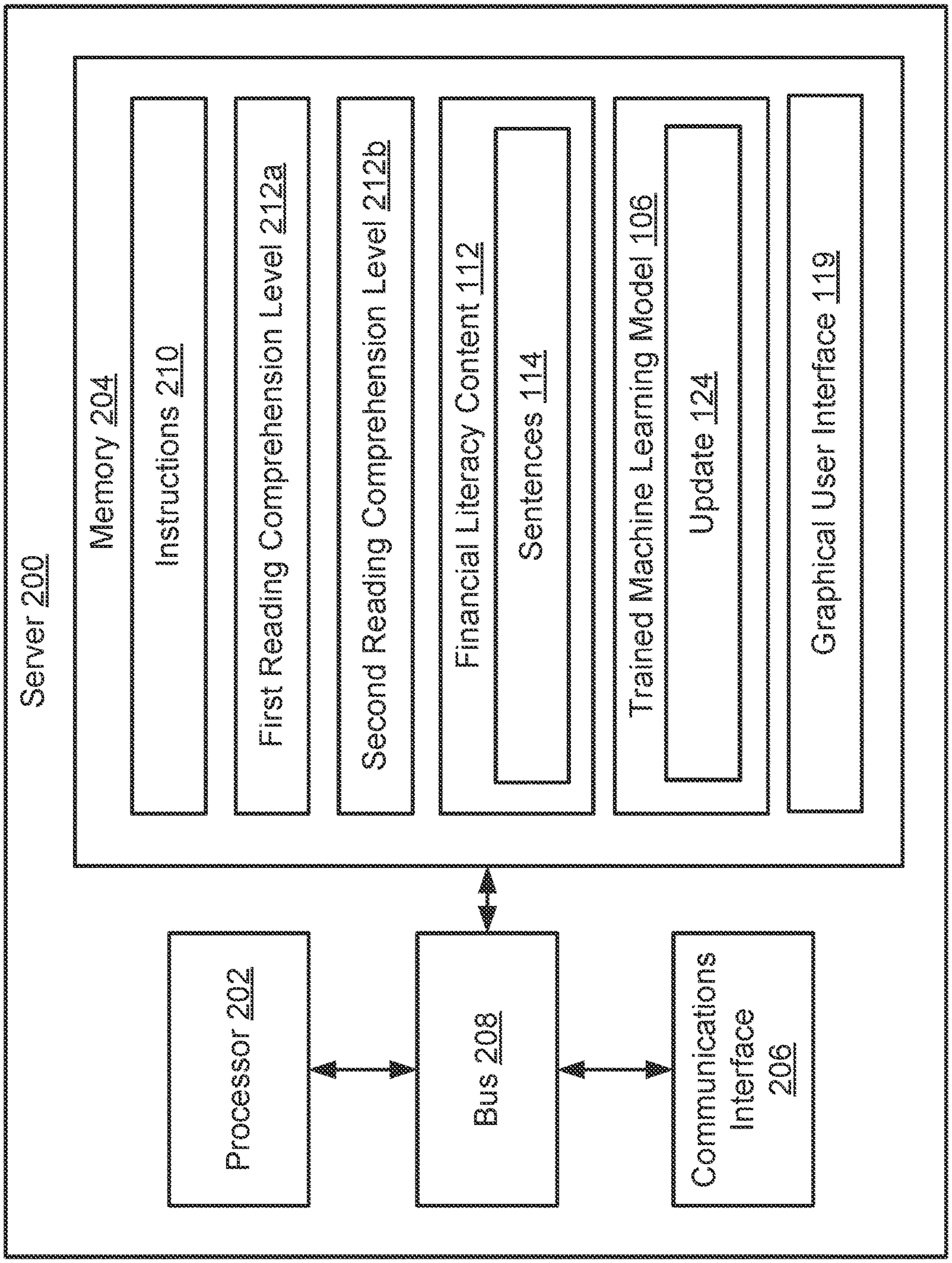
FIG. 2 is a block diagram of an example of a server for using a trained machine learning model to modify word structure according to some aspects of the present disclosure.

FIG. 2 is a block diagram of an example of a server 200 for using a trained machine learning model 106 to modify word structure according to some aspects of the present disclosure. For example, the server 200 may be used as the server 104 from FIG. 1. The server 200 can include a processor 202, a memory 204, and a communications interface 206 that are communicatively connected via a bus 208. In some examples, the components shown in FIG. 2 can be integrated into a single structure. For example, the components can be within a single housing. In other examples, the components shown in FIG. 2 can be distributed (e.g., in separate housings) and in electrical communication with each other.

The processor 202 can execute one or more operations for implementing some examples. The processor 202 can execute instructions 210 stored in the memory 204 to perform the operations. The processor 202 can include one processing device or multiple processing devices. Non-limiting examples of the processor 202 include a Field-Program mable Gate Array ("FPGA"), an application-specific integrated circuit ("ASIC"), a microprocessor, etc.

The processor 202 can be communicatively coupled to the memory 204. The non-volatile memory 204 may include any type of memory device that retains stored information when powered off. Non-limiting examples of the memory 204 include electrically erasable and programmable read-only memory ("EEPROM"), flash memory, or any other type of non-volatile memory. In some examples, at least some of the memory 204 can include a medium from which the processor 202 can read instructions. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The memory 204 can include financial literacy content 112 including sentences 114 having a first reading comprehension level 212*a*. The first reading comprehension level 212*a* can be an adult reading comprehension level. The memory 204 can additionally include a trained machine learning model 106. The sentences 114 from the financial literacy content 112 can be inputted into the trained machine learning model 106. The trained machine learning model 106 can output updates 124 to the sentences 114. The processor 202 can generate updated financial literacy content based on the updates, and the updated financial literacy content can have a second reading comprehension level 212*b* that is different than the first reading comprehension level 212*a*. For example, the second reading comprehension level 212*b* can be a child reading comprehension level that is lower than the first reading comprehension level 212*a*. The processor 202 can generate a graphical user interface 119 including the updated financial literacy content. The processor 202 can output the graphical user interface 119 via the communications interface 206 for display on a user device, such as the user device 102 depicted in FIG. 1.

Figure 3:
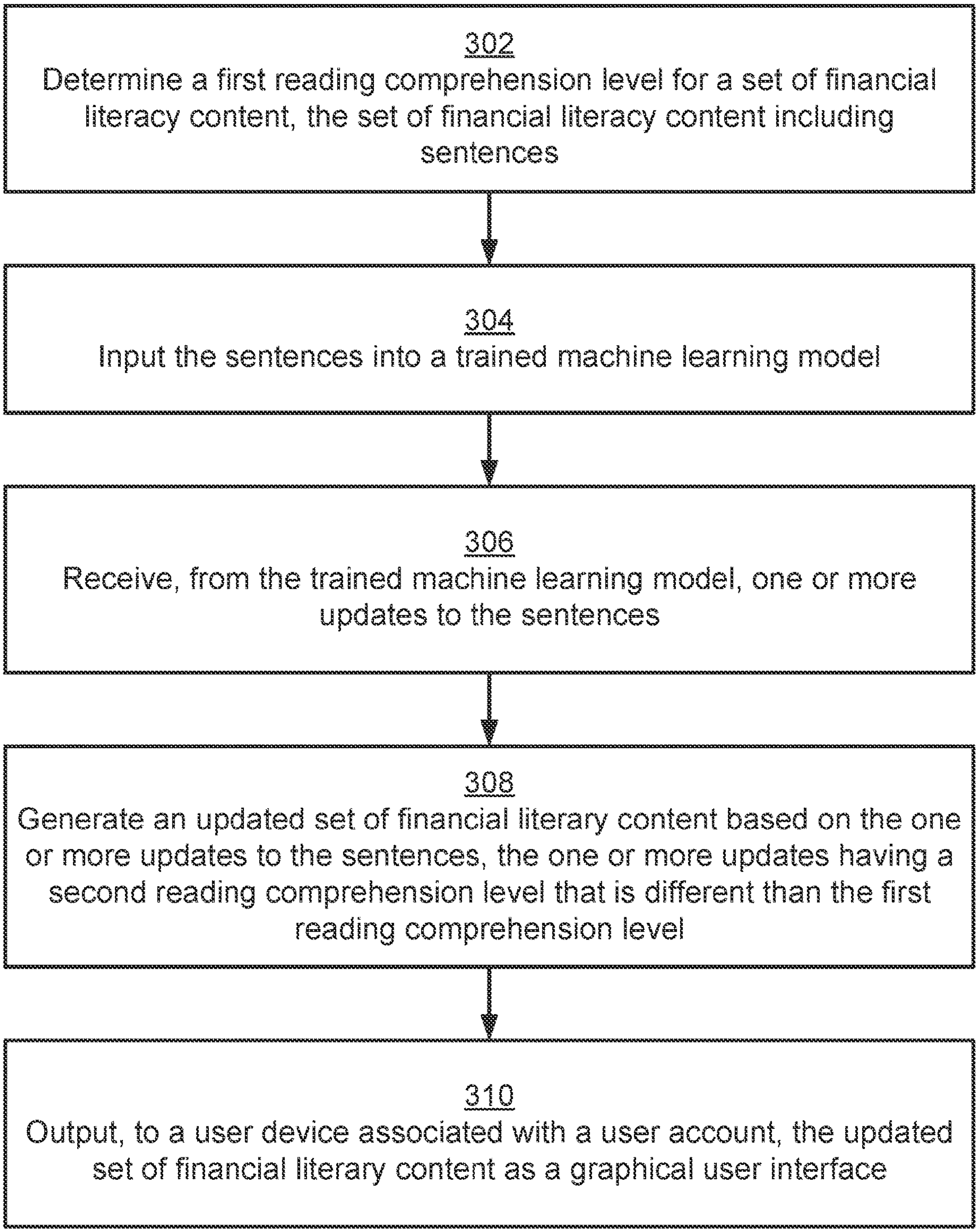
FIG. 3 is a flowchart illustrating an example of a process for using a trained machine learning model to modify word structure according to some aspects of the present disclosure.

FIG. 3 is a flowchart illustrating an example of a process for using a trained machine learning model to modify word structure according to some aspects of the present disclosure. The process of FIG. 3 can be implemented by the computing environment 100 of FIG. 1 or the server 200 of FIG. 2, but other implementations are also possible.

At block 302, the processor 202 can determine a first reading comprehension level 212*a* for a set of financial literacy content 112. The set of financial literacy content 112 can include sentences 114. In some examples, the first reading comprehension level 212*a* may be a relatively high reading comprehension level. For example, the first reading comprehension level 212*a* may correspond to a reading comprehension level of a college-educated adult.

At block 304, the processor 202 can input the sentences 114 into a trained machine learning model 106. The processor 202 may input the sentences 114 into a trained machine learning model 106 in response to a variety of factors. For example, the processor 202 may determine that a user associated with a user account 118 that displays the financial literacy content 112 has a second reading comprehension level 212*b* that differs from the first reading comprehension level 212*a*. For example, the second reading comprehension level 212*b* may correspond to a 12 year old child. The processor 202 may determine the second reading comprehension level 212*b* based on user characteristics 123, such as age, education history, and average reading speed of the user. In other examples, the processor 202 can input the sentences 114 into the trained machine learning model 106 in response to determining a change to the user characteristics 123, or in response to determining that a predetermined amount of time has passed.

At block 306, the processor 202 can receive one or more updates 124 to the sentences 114 from the trained machine learning model 106. The updates 124 include changes to the sentences 114, such as using simpler words and sentence structures. At block 308, the processor 202 can generate an updated set of financial literacy content 130 based on the one or more updates 124 to the sentences 114. The updated set of financial literacy content 130 can have a second reading comprehension level 212*b* that is different than the first reading comprehension level 212*a*. Therefore, the updated set of financial literacy content 130 can have a same reading comprehension level as the user associated with the user account 118.

At block 310, the processor 202 can output, to a user device 102 associated with a user account 118, the updated set of financial literacy content 130 as a graphical user interface 119. In some examples, the processor 202 can generate a virtual reality environment 126 as part of the graphical user interface 119. The virtual reality environment 126 may comprise interactive gaming elements 128 for teaching the user financial literacy principles via games. The updated set of financial literacy content 130 can be incorporated into the interactive gaming elements 128. The user may have an increased understanding and comprehension of the updated set of financial literacy content 130 as compared to the financial literacy content 112. As time passes and the user increases in reading comprehension level, the processor 202 may continually update the updated financial literacy content 130 displayed on the graphical user interface 119. For example, the processor 202 may periodically input the updated set of financial literacy content 130 into the trained machine learning model 106 to generate sentences 114 with reading comprehension levels that are close to the increased reading comprehension levels of the user.

The foregoing description of certain examples, including illustrated examples, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A system comprising:

a processor;

a virtual reality headset communicatively coupled with the processor; and a non-transitory computer-readable memory comprising instructions that are executable by the processor for causing the processor to:

generate a virtual reality environment associated with a user account, wherein the virtual reality environment depicts a set of financial literacy content;

cause the virtual reality headset to render the virtual reality environment for display;

determine a first reading comprehension level for the set of financial literacy content, the set of financial literacy content comprising a plurality of sentences, wherein the first reading comprehension level is determined based on a first sentence structure of the plurality of sentences;

determine a second reading comprehension level associated with the user account based on a set of user characteristics, wherein the set of user characteristics comprise an age, an education level, and an average reading speed associated with the user account, wherein the average reading speed is determined by:

detecting user activity observations associated with the user account in the virtual reality environment, wherein the user activity observations corresponding to user interactions in the virtual reality environment via the virtual reality headset; and determining, based on the user activity observations, the average reading speed, wherein the first reading comprehension level is higher than the second reading comprehension level;

input the plurality of sentences into a trained machine learning model in response to identifying a difference between the first reading comprehension level and the second reading comprehension level;

execute the trained machine learning model to generate one or more updates to the plurality of sentences based on the plurality of sentences and the difference, the one or more updates to the plurality of sentences comprising a second sentence structure corresponding to the second reading comprehension level;

generate an updated set of financial literacy content by modifying the set of financial literacy content based on the one or more updates to the plurality of sentences;

determine that the updated set of financial literacy content does not have a reading comprehension level that matches the second reading comprehension level associated with the user account;

in response to determining that the reading comprehension level of the updated set of financial literacy content does not match the second reading comprehension level associated with the user account:

execute an iterative process using the trained machine learning model to further modify the updated set of financial literacy content, wherein the iterative process comprises a plurality of iterations, and wherein each iteration of the plurality of iterations involves:

using an output from a previous iteration of the iterative process as an input to the trained machine learning model for a current iteration of the iterative process, wherein the updated set of financial literacy content is used as the input to the trained machine learning model during a first iteration of the iterative process;

executing the trained machine learning model on the input to generate an additional update for the set of financial literacy content;

modifying the updated set of financial literacy content based on the additional update to produce the output for the current iteration of the iterative process;

determining whether the output for the current iteration matches the second reading comprehension level associated with the user account; and repeating the iterative process if the output for the current iteration does not match the second reading comprehension level associated with the user account; and after completing the iterative process, update the rendering of the virtual reality environment on the virtual reality headset to cause the virtual reality environment to include the updated set of financial literacy content as modified by the iterative process.

2. The system of claim 1, wherein the memory further comprises instructions that are executable by the processor for causing the processor to input the plurality of sentences into the trained machine learning model in response to:

determining a change to the set of user characteristics.

3. The system of claim 1, wherein the memory further comprises instructions that are executable by the processor for causing the processor to input the plurality of sentences into the trained machine learning model in response to:

determining that a predetermined amount of time has passed.

4. The system of claim 1, wherein the memory further comprises instructions that are executable by the processor for causing the processor to generate the virtual reality environment by:

generating an interactive gaming element in the virtual reality environment, the interactive gaming element comprising the updated set of financial literacy content.

5. A method comprising:

generating, by a processor, a virtual reality environment associated with a user account, wherein the virtual reality environment depicts a set of financial literacy content;

causing, by the processor, a virtual reality headset to render the virtual reality environment for display;

determining, by the processor, a first reading comprehension level for the set of financial literacy content, the set of financial literacy content comprising a plurality of sentences, wherein the first reading comprehension level is determined based on a first sentence structure of the plurality of sentences;

determining, by the processor, a second reading comprehension level associated with the user account based on a set of user characteristics, wherein the set of user characteristics comprise an age, an education level, and an average reading speed associated with the user account, wherein the average reading speed is determined by:

detecting, by the processor, user activity observations associated with the user account in the virtual reality environment, wherein the user activity observations corresponding to user interactions in the virtual reality environment via the virtual reality headset; and determining, by the processor and based on the user activity observations, the average reading speed, wherein the first reading comprehension level is higher than the second reading comprehension level;

inputting, by the processor, the plurality of sentences into a trained machine learning model in response to identifying a difference between the first reading comprehension level and the second reading comprehension level;

executing, by the processor, the trained machine learning model to generate one or more updates to the plurality of sentences, the one or more updates to the plurality of sentences comprising a second sentence structure corresponding to the second reading comprehension level;

generating, by the processor, an updated set of financial literacy content by modifying the set of financial literacy content based on the one or more updates to the plurality of sentences;

determining, by the processor, that the updated set of financial literacy content does not have a reading comprehension level that matches the second reading comprehension level associated with the user account;

in response to determining that the reading comprehension level of the updated set of financial literacy content does not match the second reading comprehension level associated with the user account:

executing, by the processor, an iterative process using the trained machine learning model to further modify the updated set of financial literacy content, wherein the iterative process comprises a plurality of iterations, and wherein each iteration of the plurality of iterations involves:

using an output from a previous iteration of the iterative process as an input to the trained machine learning model for a current iteration of the iterative process, wherein the updated set of financial literacy content is used as the input to the trained machine learning model during a first iteration of the iterative process;

executing the trained machine learning model on the input to generate an additional update for the set of financial literacy content;

modifying the updated set of financial literacy content based on the additional update to produce the output for the current iteration of the iterative process;

determining whether the output for the current iteration matches the second reading comprehension level associated with the user account; and repeating the iterative process if the output for the current iteration does not match the second reading comprehension level associated with the user account; and after completing the iterative process, updating, by the processor, the rendering of the virtual reality environment on the virtual reality headset to cause the virtual reality environment to include the updated set of financial literacy content as modified by the iterative process.

6. The method of claim 5, wherein the plurality of sentences are inputted into the trained machine learning model in response to:

determining a change to the set of user characteristics.

7. The method of claim 5, wherein the plurality of sentences are inputted into the trained machine learning model in response to:

determining that a predetermined amount of time has passed.

8. The method of claim 5, wherein generating the virtual reality environment further comprises:

generating an interactive gaming element in the virtual reality environment, the interactive gaming element comprising the updated set of financial literacy content.

9. A non-transitory computer-readable medium comprising program code that is executable by a processor for causing the processor to:

generate a virtual reality environment associated with a user account, wherein the virtual reality environment depicts a set of financial literacy content;

cause a virtual reality headset to render the virtual reality environment for display;

determine a first reading comprehension level for the set of financial literacy content, the set of financial literacy content comprising a plurality of sentences, wherein the first reading comprehension level is determined based on a first sentence structure of the plurality of sentences;

determine a second reading comprehension level associated with the user account based on a set of user characteristics, wherein the set of user characteristics comprise an age, an education level, and an average reading speed associated with the user account, wherein the average reading speed is determined by:

detecting user activity observations associated with the user account in the virtual reality environment, wherein the user activity observations corresponding to user interactions in the virtual reality environment via the virtual reality headset; and determining, based on the user activity observations, the average reading speed, wherein the first reading comprehension level is higher than the second reading comprehension level;

in response to identifying a difference between the first reading comprehension level and the second reading comprehension level:

execute an iterative process using a trained machine learning model to generate an updated set of financial literacy content, wherein the iterative process comprises a plurality of iterations, and wherein each iteration of the plurality of iterations involves:

using an output from a previous iteration of the iterative process as an input to the trained machine learning model for a current iteration of the iterative process, wherein the set of financial literacy content is used as the input to the trained machine learning model during a first iteration of the iterative process;

executing the trained machine learning model on the input to generate an update for the set of financial literacy content;

modifying the set of financial literacy content based on the update to produce the output for the current iteration of the iterative process;

determining whether the output for the current iteration matches the second reading comprehension level associated with the user account; and repeating the iterative process if the output for the current iteration does not match the second reading comprehension level associated with the user account;

and update the rendering of the virtual reality environment on the virtual reality headset to cause the virtual reality environment to include the updated set of financial literacy content as generated by the iterative process.

10. The non-transitory computer-readable medium of claim 9, wherein the program code is further executable by the processor for causing the processor to input the plurality of sentences into the trained machine learning model in response to:

determining a change to the set of user characteristics.

11. The non-transitory computer-readable medium of claim 9, wherein the program code is further executable by the processor for causing the processor to input the plurality of sentences into the trained machine learning model in response to:

determining that a predetermined amount of time has passed.

12. The system of claim 1, wherein the trained machine learning model is a neural network.

13. The method of claim 5, wherein the trained machine learning model is a neural network.

14. The non-transitory computer-readable medium of claim 9, wherein the trained machine learning model is a neural network.

15. The system of claim 1, wherein the memory further comprises instructions that are executable by the processor for causing the processor to:

subsequent to updating the rendering of the virtual reality environment, determine, based on a user interaction with the updated set of financial literacy content, that a condition within the virtual reality environment has been met; and automatically transfer a fund from another account to the user account.

16. The method of claim 5, further comprising:

subsequent to updating the rendering of the virtual reality environment, determining, based on a user interaction with the updated set of financial literacy content, that a condition within the virtual reality environment has been met; and automatically transferring a fund from another account to the user account.

17. The non-transitory computer-readable medium of claim 9, wherein the program code is further executable by the processor for causing the processor to:

subsequent to updating the rendering of the virtual reality environment, determine, based on a user interaction with the updated set of financial literacy content, that a condition within the virtual reality environment has been met; and automatically transfer a fund from another account to the user account.

18. The system of claim 1, wherein the memory further comprises instructions that are executable by the processor for causing the processor to, after completing the iterative process, periodically re-execute the trained machine learning model to further modify the updated set of financial literacy content over time for the user account.

19. The method of claim 5, further comprising periodically re-executing the trained machine learning model to, after completing the iterative process, further modify the updated set of financial literacy content over time for the user account.

20. The non-transitory computer-readable medium of claim 9, wherein the program code is further executable by the processor for causing the processor to, after completing the iterative process, periodically re-execute the trained machine learning model to further modify the updated set of financial literacy content over time for the user account.

* * * * *